US009875214B2

(12) United States Patent
Eyole et al.

(10) Patent No.: US 9,875,214 B2
(45) Date of Patent: Jan. 23, 2018

(54) APPARATUS AND METHOD FOR TRANSFERRING A PLURALITY OF DATA STRUCTURES BETWEEN MEMORY AND A PLURALITY OF VECTOR REGISTERS

(71) Applicants: ARM LIMITED, Cambridge (GB); APPLE, INC., Cupertino, CA (US)

(72) Inventors: Mbou Eyole, Cambridge (GB); Nigel John Stephens, Cambridge (GB); Jeffry Gonion, Cupertino, CA (US); Alex Klaiber, Cupertino, CA (US); Charles Tucker, Cupertino, CA (US)

(73) Assignees: ARM Limited, Cambridge (GB); Apple, Inc., Cupertino, CA (US)

( * ) Notice: Subject to any disclaimer, the term of this patent is extended or adjusted under 35 U.S.C. 154(b) by 360 days.

(21) Appl. No.: 14/814,590

(22) Filed: Jul. 31, 2015

(65) Prior Publication Data

US 2017/0031865 A1  Feb. 2, 2017

(51) Int. Cl.
*G06F 9/30* (2006.01)
*G06F 9/312* (2006.01)
(Continued)

(52) U.S. Cl.
CPC ........ *G06F 15/8076* (2013.01); *G06F 9/3004* (2013.01); *G06F 9/30036* (2013.01);
(Continued)

(58) Field of Classification Search
USPC .................................................. 712/225, 22
See application file for complete search history.

(56) References Cited

U.S. PATENT DOCUMENTS 7,219,214 B2   5/2007 Ford et al.
7,219,215 B2   5/2007 Ford et al.
(Continued)

FOREIGN PATENT DOCUMENTS

EP  1 939 727      7/2008
GB  2 297 638      8/1996
WO  2013/180738   12/2013

OTHER PUBLICATIONS

International Search Report and Written Opinion of the International Searching Authority dated Oct. 20, 2016 in PCT/GB2016/051841, 14 pages.

*Primary Examiner* — Yuqing Xiao
(74) *Attorney, Agent, or Firm* — Nixon & Vanderhye P.C.

(57) ABSTRACT

An apparatus and method are provided for transferring a plurality of data structures between memory and a plurality of vector registers, each vector register being arranged to store a vector operand comprising a plurality of data elements. Access circuitry is used to perform access operations to move data elements of vector operands between the data structures in memory and specified vector registers, each data structure comprising multiple data elements stored at contiguous addresses in the memory. Decode circuitry is responsive to a single access instruction identifying a plurality of vector registers and a plurality of data structures that are located discontiguously with respect to each other in the memory, to generate control signals to control the access circuitry to perform a sequence of access operations to move the plurality of data structures between the memory and the plurality of vector registers such that the vector operand in each vector register holds a corresponding data element from each of the plurality of data structures. This provides a very efficient mechanism for performing complex access operations, resulting in an increase in execution speed, and potential reductions in power consumption.

25 Claims, 13 Drawing Sheets

(51) Int. Cl.
  *G06F 9/34*   (2006.01)
  *G06F 9/345*  (2006.01)
  *G06F 9/35*   (2006.01)
  *G06F 9/355*  (2006.01)
  *G06F 9/38*   (2006.01)
  *G06F 15/80*  (2006.01)

(52) U.S. Cl.
  CPC ...... *G06F 9/30043* (2013.01); *G06F 9/30101* (2013.01); *G06F 9/30109* (2013.01); *G06F 9/345* (2013.01); *G06F 9/3887* (2013.01); *G06F 9/3455* (2013.01); *G06F 9/355* (2013.01)

(56) References Cited

U.S. PATENT DOCUMENTS

| | | | |
|---|---|---|---|
| 9,348,592 B2* | 5/2016 | Jha | G06F 9/30014 |
| 2004/0255102 A1* | 12/2004 | Dijkstra | G06F 9/30043 |
| | | | 712/225 |
| 2010/0106944 A1 | 4/2010 | Symes et al. | |
| 2012/0060016 A1* | 3/2012 | Eichenberger | G06F 9/30018 |
| | | | 712/4 |
| 2012/0151156 A1* | 6/2012 | Citron | G06F 9/30043 |
| | | | 711/154 |
| 2013/0326160 A1 | 12/2013 | Sperber et al. | |

* cited by examiner

APPARATUS AND METHOD FOR TRANSFERRING A PLURALITY OF DATA STRUCTURES BETWEEN MEMORY AND A PLURALITY OF VECTOR REGISTERS

BACKGROUND

The present technique relates to an apparatus and method for transferring a plurality of data structures between memory and a plurality of vector registers.

One known technique for improving performance of a data processing apparatus is to provide circuitry to support execution of vector operations. Vector operations are performed on at least one vector operand, where each vector operand comprises a plurality of data elements. Performance of the vector operation then involves applying an operation repetitively across the various data elements within the vector operand(s).

Vector processing circuitry (often referred to as SIMD (Single Instruction Multiple Data) processing circuitry) may be used to provide multiple lanes of parallel processing in order to perform operations in parallel on the various data elements within the vector operands.

Although the use of such vector operations can result in significant performance benefits, a problem that arises is how to efficiently move the data elements required for the vector operations between memory and vector registers used to store the vector operands. In particular, the individual data elements required may be stored within a series of data structures within memory, where each data structure may include multiple related data elements, for example X, Y and Z coordinate values, red, green and blue pixel values, real and imaginary parts of complex numbers, etc. However, to enable efficient use of vector operations it is useful if a vector register stores a vector operand consisting of a series of corresponding data elements from a plurality of such data structures. Hence, using the above example of X, Y and Z coordinate values, it may be desirable for one vector register to store multiple X coordinate values, another vector register to store multiple Y coordinate values and a further vector register to store multiple Z coordinate values.

It would be desirable to provide a technique for efficiently transferring a plurality of data structures between memory and a plurality of vector registers.

SUMMARY

In a first example configuration, there is provided an apparatus comprising: a set of vector registers, each vector register arranged to store a vector operand comprising a plurality of data elements; access circuitry to perform access operations to move data elements of vector operands between data structures in memory and said set of vector registers, each data structure comprising multiple data elements stored at contiguous addresses in said memory; decode circuitry, responsive to a single access instruction identifying a plurality of vector registers from said set and a plurality of data structures that are located discontiguously with respect to each other in said memory, to generate control signals to control the access circuitry to perform a sequence of said access operations to move said plurality of data structures between said memory and said plurality of vector registers such that the vector operand in each vector register of said plurality holds a corresponding data element from each of said plurality of data structures.

In another example configuration, there is provided a method of operating an apparatus to perform access operations to move data elements of vector operands between data structures in memory and a set of vector registers of the apparatus, each vector register arranged to store a vector operand comprising a plurality of data elements, and each data structure comprising multiple data elements stored at contiguous addresses in said memory, the method comprising: decoding a single access instruction identifying a plurality of vector registers from said set and a plurality of data structures that are located discontiguously with respect to each other in said memory, to generate control signals to control access circuitry to perform a sequence of said access operations in order to move said plurality of data structures between said memory and said plurality of vector registers; and moving, during performance of said sequence of access operations, the multiple data elements of each data structure such that the vector operand in each vector register of said plurality holds a corresponding data element from each of said plurality of data structures.

In a yet further example configuration, there is provided an apparatus comprising: a set of vector register means, each vector register means for storing a vector operand comprising a plurality of data elements; access means for performing access operations to move data elements of vector operands between data structures in memory and said set of vector register means, each data structure comprising multiple data elements stored at contiguous addresses in said memory; decode means for generating, in response to a single access instruction identifying a plurality of vector register means from said set and a plurality of data structures that are located discontiguously with respect to each other in said memory, control signals to control the access means to perform a sequence of said access operations to move said plurality of data structures between said memory and said plurality of vector register means such that the vector operand in each vector register means of said plurality holds a corresponding data element from each of said plurality of data structures.

In an alternative configuration there is provided a computer program stored on a non-transitory computer readable storage medium that, when executed by a data processing apparatus, provides a virtual machine which provides an instruction execution environment corresponding to the apparatus of the above-mentioned first example configuration.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
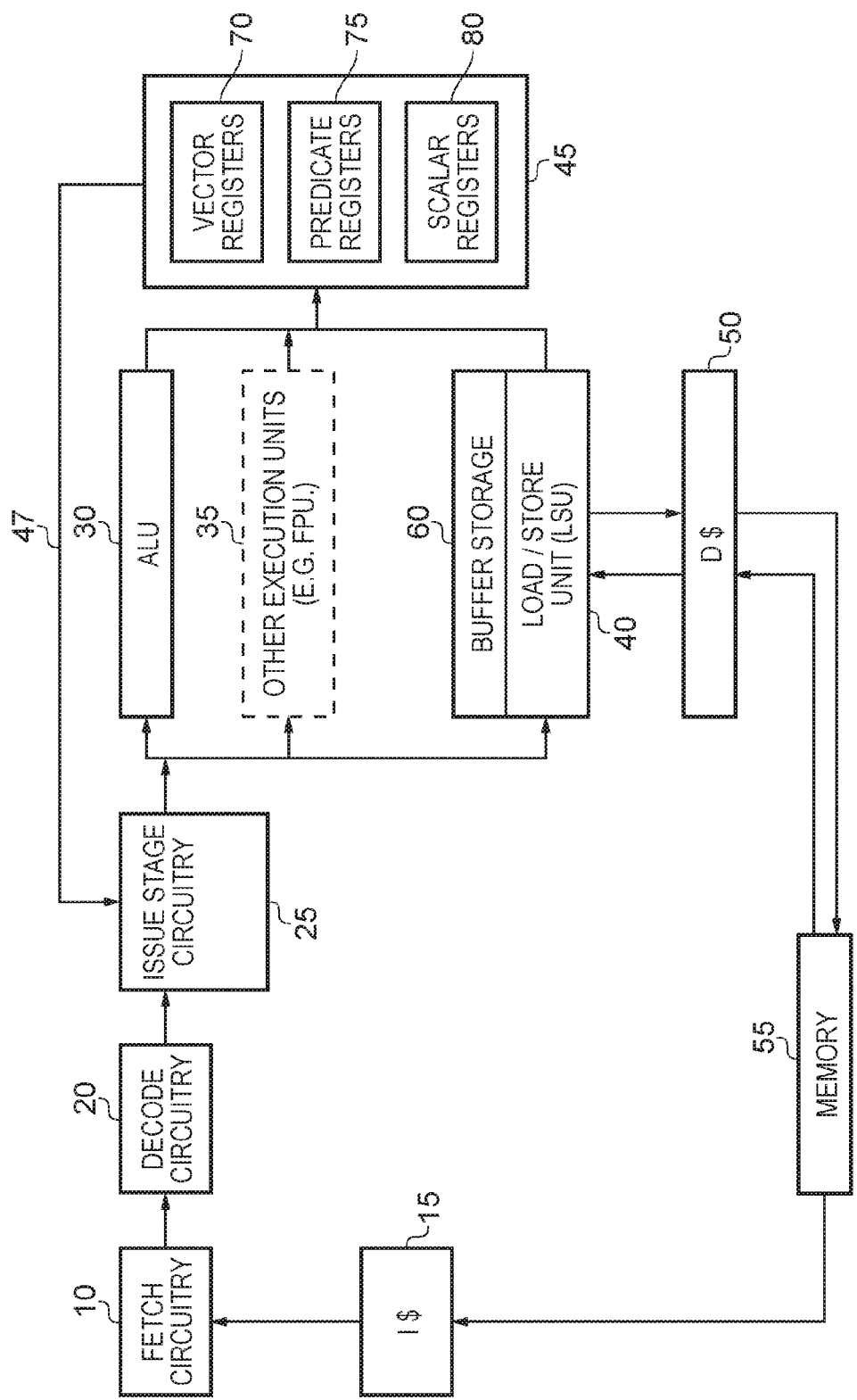
FIG. 1 is a block diagram of a data processing apparatus in accordance with one embodiment.

Before discussing the embodiments with reference to the accompanying figures, the following description of embodiments is provided.

In accordance with one embodiment, an apparatus has a set of vector registers, where each vector register is arranged to store a vector operand comprising a plurality of data elements, and access circuitry to perform access operations in order to move data elements of vector operands between data structures in memory and that set of vector registers. Each data structure comprises multiple data elements stored at contiguous addresses in the memory. The access circuitry may thus perform load operations in order to move data elements of data structures from memory into vector registers, or may perform store operations in order to read the vector operands in multiple vector registers and to then store the data elements contained in those vector operands out to memory as a series of data structures.

In accordance with one embodiment, decode circuitry is provided that is responsive to a single access instruction identifying a plurality of vector registers and a plurality of data structures that are located discontiguously (also referred to herein as non-contiguously) with respect to each other in memory, to generate control signals to control the access circuitry to perform a particular sequence of access operations. In particular, the access circuitry is responsive to those control signals to move the plurality of data structures identified by the instruction between the memory and the plurality of vector registers identified by the instruction such that the vector operand in each vector register holds a corresponding data element from each of the plurality of data structures. In one embodiment, the corresponding data elements held in a vector register are from the same relative position within each of the plurality of data structures.

In one embodiment the access circuitry rearranges the multiple data elements of one of more of the plurality of data structures as they are moved between the memory and the plurality of vector registers.

As used herein, when describing data structures as being discontiguously located with respect to each other, this means that there are one or more data element locations provided in the memory address space between the last data element of one data structure and the first data element of the next data structure. Such data structures will also be referred to as discontiguous (or non-contiguous) data structures herein.

By employing a single access instruction as set out above, this provides a very efficient mechanism for accessing multiple discontiguous data structures in memory, and in particular for moving the data elements of those various data structures between the data structures and a plurality of vector registers, in either direction. In one embodiment, the access circuitry is not only responsive to the single access instruction to perform the required retrieval of the various data structures from memory in the event of a load instruction, or storing of the various data structures to memory in the event of a store operation, but also performs required rearrangement operations in order to ensure that within the vector registers each vector register stores a vector operand that comprises a series of corresponding data elements from each of the plurality of data structures.

Hence, considering the earlier example where each data structure includes X, Y and Z coordinate values, one of the vector registers specified by the single access instruction may store a series of X coordinate values, whilst another vector register may store a series of Y coordinate values and a further vector register may store a series of Z coordinate values.

The use of such a single access instruction can significantly increase execution speed by reducing the number of instructions that need to be executed in order to perform accesses to multiple discontiguous data structures in memory. By using such instructions, it is possible to reduce the number of instructions which need to flow through the fetch, decode and other preliminary stages of a pipelined processing unit, which can often result in a significant reduction in overall power consumption.

It has also been found that the use of such a single access instruction facilitates more accurate programming due to it raising the level of abstraction and making complex accesses less error prone.

The single access instruction may be a load instruction, in which event the access circuitry is responsive to the control signals to perform the sequence of access operations in order to obtain the data elements of each identified data structure from the memory and to write into each identified vector register a vector operand comprising a corresponding data element from each of the plurality of data structures.

There are a number of ways in which the sequence of access operations can be performed in order to execute the required load instruction, but in one embodiment the sequence of access operations comprises a sequence of gather operations, each gather operation obtaining a corresponding data element from each of the plurality of data structures and writing the obtained data elements into a vector register associated with that gather operation. Each gather operation can in turn be decomposed into a series of micro-operations if required.

The single access instruction may in one embodiment take the form of a store instruction, in which event the access circuitry is responsive to the control signals to perform said sequence of access operations in order to read from each identified vector register a vector operand comprising a corresponding data element from each of said plurality of data structures, and to rearrange the data elements as they are written to said memory so as to store each data structure at an address in the memory corresponding to its discontiguous location whilst ensuring that the data elements of each individual data structure are stored at contiguous addresses in the memory.

There are a number of ways in which the sequence of access operations can be constructed in order to execute the store instruction, but in one embodiment that sequence comprises a sequence of scatter operations, each scatter operation obtaining from a vector register associated with that scatter operation a vector operand comprising a corresponding data element from each of said plurality of data structures, and writing the data elements of that vector operand to addresses in the memory determined from the addresses of the plurality of data structures. As with the gather operations, the scatter operations can be decomposed into a series of micro-operations if required.

The single access instruction can be specified in a variety of ways. In one embodiment, it includes a data structure identifier field providing information used to determine the addresses of the plurality of data structures. The data structure identifier field can take a variety of forms. In one embodiment, the apparatus further comprises a set of scalar registers to store scalar data values, and the data structure identifier field comprises a scalar register identifier field identifying a scalar register whose stored scalar data value is used to determine a base address in the memory. In one embodiment the base address forms a common reference point for all of the data structure addresses. In addition, the data structure identifier field includes a stride identifier field containing stride information used to derive the addresses of the plurality of data structures from the base address. This provides a very flexible mechanism for specifying the various addresses of the discontiguous data structures. For example, by updating the base address between multiple instances of the single access instruction, it would be possible to access a large number of data structures in memory using the same stride information. This is particularly useful in situations where the stride information identifies a constant stride value.

The stride information is used to identify the distance in terms of memory address space separating corresponding data elements in adjacent data structures of the plurality of discontiguous data structures identified by the single access instruction. The stride information can be specified in a number of ways, but in one embodiment is specified as a number of bytes. Alternatively the stride information may specify a number scaled by the number of bytes in each data element. In one such embodiment the data element size may form a parameter that can be embedded within the instruction in an additional field.

In embodiments where a constant stride value is specified by the stride information, the stride identifier field may either include an immediate value specifying that constant stride value, or may specify a scalar register whose contents identify the constant stride value.

However, it is not required that a constant stride value is used, and in particular it is not required that each of the discontiguous data structures to be accessed is separated by a regular spacing in memory. Instead, in one embodiment the stride information may identify a series of stride values, where each stride value is associated with at least one of the plurality of data structures. This hence enables the plurality of data structures accessed by execution of the single access instruction to reside at arbitrary addresses within the memory.

In embodiments where the stride information identifies a series of stride values, there are a number of ways in which the stride identifier field can identify that series of stride values. In one embodiment, the stride identifier field identifies a vector register, and each data element in the vector register identifies a stride value to be used to determine from the base address the address of an associated one of the data structures.

In an alternative embodiment the data structure identifier field does not specify a base address, but instead identifies a vector register, where each data element in that vector register provides pointer data used to determine the address of an associated one of the data structures. Again, this allows the plurality of data structures to be accessed to reside at arbitrary locations in memory, and there is no requirement for a constant stride between those required data structures.

In one embodiment, the single access instruction further includes a vector register identifier field providing information used to determine the plurality of vector registers to be accessed. In one embodiment, the instruction might directly identify each of the vector registers independently. However, often the available encoding space of the instruction is quite limited, and there may be insufficient space to allow for independent identification of each of the vector registers. Instead, in one embodiment, the vector register identifier field may comprise a vector register identifier used to identify one vector register in said set, and an integer value used to identify the number of vector registers in said plurality of vector registers to be accessed. The decode circuitry is then arranged to apply a predetermined rule in order to determine each vector register in said plurality from the identified one vector register and the integer.

Hence, in such an embodiment only a single vector register need be identified, and the other vector registers can be inferred by application of the predetermined rule using the integer value also specified in the instruction. In one particular embodiment, the decode circuitry is arranged to determine, as the plurality of vector registers to be accessed, a consecutive plurality of vector registers including the identified one vector register. Hence, in that embodiment, a series of adjacent vector registers in the set of vector registers are used when executing the single access instruction.

In a yet further embodiment, where instruction encoding space is particularly constrained, it can be arranged that the plurality of vector registers is predetermined, and accordingly do not require an explicit reference within the single access instruction encoding. For example it may be predetermined that such a single access instruction always operates using a predetermined series of consecutive vector registers, for example vector registers 0, 1 and 2.

In one embodiment, the access circuitry operates on a plurality of lanes, with each lane incorporating a corresponding data element position from each of the plurality of vector registers. Whilst in one embodiment execution of the single access instruction may cause access operations to be performed in respect of each of the lanes, in an alternative embodiment the single access instruction may include a predicate identifier field providing predicate information used to determine which of the plurality of lanes are active lanes for the sequence of access operations. Access operations are then only performed for the active lanes, and no further processing is required in respect of the inactive lanes. In particular, the access circuitry is arranged to determine, as the plurality of data structures to be moved, those data structures associated with the active lanes. This provides significantly enhanced flexibility in how the single access instruction is used, and how the data structures to be accessed are specified. Purely by way of example, it may mean that a regular stride value can be specified, even though one or more of the data structures that would be identified by that regular stride do not need to be accessed. For those data structures, the corresponding lane can be marked as inactive by the predicate information.

The predicate information can also be used for other purposes. For example, when the single access instruction is a load instruction, the access circuitry may be arranged to perform a compaction operation using the predicate information, the predicate information being used to identify the plurality of data structures to be loaded, and the access circuitry being arranged to store those data structures within a series of consecutive lanes within the plurality of vector registers. This can provide enhanced efficiency, by avoiding the need for subsequent instructions to be executed in order to perform rearrangement operations to remove any unwanted data elements.

In one embodiment, the single access instruction may also include an offset identifier field providing offset data to be applied in combination with the information in the data structure identifier field when determining the addresses of the plurality of data structures. This is particularly useful when performing loop unrolling of code in order to make more efficient use of vector operations. In particular, within the same iteration of a loop, it may then be possible to use multiple invocations of the single access instruction, with each invocation merely using a different offset value. This hence enables an increase in the number of vectors worth of data that can be accessed in the same iteration of the unrolled loop.

The access circuitry can take a variety of forms, but in one embodiment comprises a load/store unit and an associated buffer storage to allow data elements to be temporarily buffered during performance of the sequence of access operations.

In an alternative embodiment, the access circuitry may comprise a load/store unit and a vector permute unit which operate in combination to perform the sequence of access operations.

In one embodiment, the load/store unit and vector permute unit are arranged to exchange data elements via one or more vector registers in said set that are used to store intermediate vectors of data elements. Such an approach would hence enable the load/store unit to perform standard load or store operations in order to move a series of data elements between registers and memory where the data elements in each access occupy contiguous addresses in memory, with the vector permute unit then performing the required reordering of data elements. For a load instruction, the vector permute unit would hence perform that reordering after the load/store unit had loaded the required data elements, whilst for a store operation the vector permute unit would perform the required reordering prior to the load/store unit then performing the required store operations.

Particular embodiments will now be described with reference to the Figures.

FIG. 1 is a block diagram of a system in which the techniques of the described embodiments may be employed. In the example shown in FIG. 1, the system takes the form of a pipelined processor. Instructions are fetched from an instruction cache 15 by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40 within the pipelined processor.

The issue stage circuitry 25 has access to the registers 45 in which data values forming source operands for the various operations can be stored. These source operands can be routed via a path 47 into the issue stage circuitry, so that those source operands can be dispatched to the appropriate execution unit along with the control signals identifying the operation(s) to be performed to implement each decoded instruction. Arithmetic operations may for example be forwarded to the arithmetic logic unit (ALU) 30 along with the required source operands, in order to enable an arithmetic logic operation to be performed on those source operands, with the result value typically being output as a destination operand for storing in a specified register of the registers 45.

In addition to the ALU 30, other execution units 35 may be provided, for example a floating point unit (FPU) for performing floating point operations in response to decoded floating point instructions. In addition, a load/store unit (LSU) 40 is used for performing load operations in order to load data values from memory 55, via one or more levels of data cache 50, into specified ones of the registers 45, and for performing store operations in order to store data values from specified registers back to the memory 55.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) will be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer will typically be provided to keep track of the out of order execution, and to allow the results of the execution of the various instructions to be committed in order.

In the described embodiments, the processing circuitry of FIG. 1 is arranged to execute vector operations on vector operands stored in the registers 45, where a vector operand comprises a plurality of data elements. When a vector operation is performed on such a vector operand, the required operation is applied repetitively across the various data elements within the vector operand. In one embodiment the registers 45 includes a set of vector registers 70, where each vector register may store a vector operand comprising a plurality of data elements.

The register bank may also include other registers, for example a set of scalar registers 80 for storing scalar data values, and one or more predicate registers 75 for storing predicate information. The predicate information provides predicate data for each data element position within a vector operand. The predicate data within a predicate register hence specifies a vector of Boolean (i.e. true/false) conditions, with each data element within an associated vector operand being associated with one of those Boolean conditions. Whilst in one embodiment there may be a 1:1 relationship between the number of items of predicate conditions within the predicate data and the number of data elements in an associated vector operand controlled by that predicate data, this is not essential, and in alternative embodiments a single item of predicate data may provide a condition which is applied to multiple data elements. Further, whilst in one embodiment each predicate item within the predicate data takes the form of a single bit, there is no requirement for each predicate item to be specified by only a single bit.

In accordance with one embodiment, a particular type of access instruction is defined which identifies a plurality of vector registers from the set 70, and also a plurality of discontiguous data structures in memory, and the decode circuitry 20 is responsive to decoding such an instruction to generate control signals that are passed via the issue stage circuitry 25 to the load/store unit 40 in order to cause the load/store unit to move the identified plurality of data structures between the memory and the specified plurality of vector registers. In addition, as part of the sequence of operations performed by the load/store unit in order to implement execution of that access instruction, the load/store unit is arranged to rearrange the multiple data elements of each data structure as they are moved such that the vector operand in each vector register holds a corresponding data element from each of the plurality of data structures. To assist in this process, the load/store unit 40 has access to local buffer storage 60 in which it may buffer certain data elements during this process.

Figure 2:
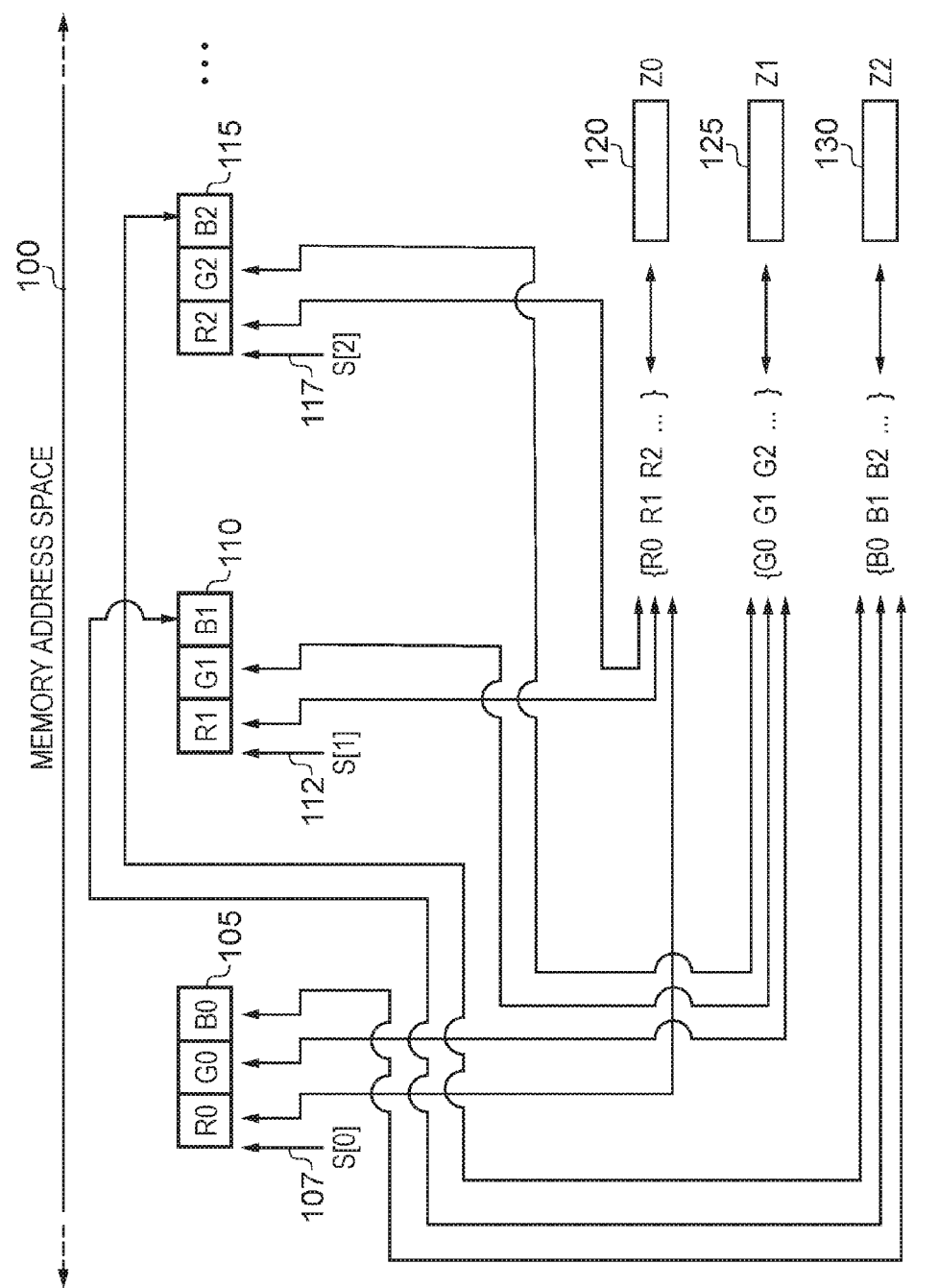
FIG. 2 is a diagram schematically illustrating how individual data elements may be rearranged when transferring those data elements between memory and a plurality of vector registers, in accordance with one embodiment.

The movement and rearrangement performed by the load/store unit 40 is illustrated schematically in FIG. 2. Here, a sequence of discontiguous data structures 105, 110, 115 are shown located at corresponding addresses 107, 112, 117 within the memory address space 100. The earlier mentioned new access instruction will provide sufficient information to enable the various addresses 107, 112, 117 for each of the required data structures 105, 110, 115 to be determined, and will also identify a series of vector registers 120, 125, 130. The number of vector registers identified is intrinsically linked to the number of data elements in each of the data structures. In this example, it is assumed that there are three data elements in each data structure, and in the specific example of FIG. 2 those data elements are assumed to represent red, green and blue pixel values. If the access instruction is a load instruction, the operations performed by the load/store unit 40 will cause the various data structures 105, 110, 115 to be accessed, and for the data elements to be reordered so that each of the vector registers 120, 125, 130 receives a vector operand consisting of a sequence of data elements that are corresponding data elements from the multiple data structures. Hence, by way of example the vector register 120 may receive a vector operand containing a series of red pixel values, the vector register 125 may receive a vector operand comprising a series of green pixel values, and the vector register 130 may receive a vector operand comprising a series of blue pixel values.

The access instruction may alternatively be a store instruction, where the contents of the specified vector registers are read, and then a rearrangement is performed so that the data elements are written out to their respective locations within the multiple data structures 105, 110, 115 at the addresses 107, 112, 117.

The number of data elements contained within each vector operand will depend on the size of the vector registers, and on the data element size. Purely by way of example, in one embodiment each vector register may be 32 bits in length, and each data element may be a byte, as a result of which each vector register will store four data elements. However, in other embodiments different sized vector registers may be used, and indeed the data elements may have different sizes.

Figure 3:
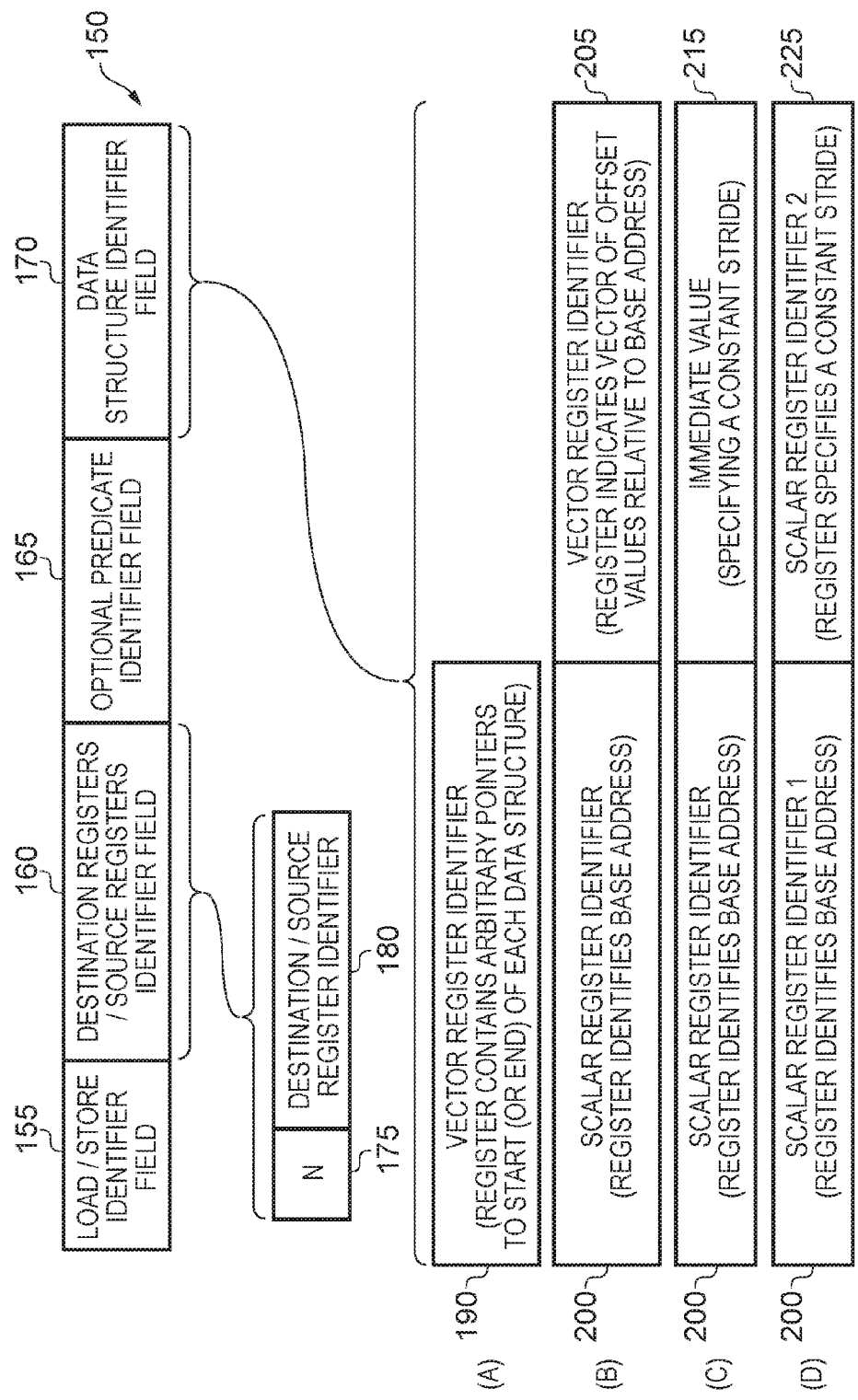
FIG. 3 schematically illustrates the format of a single access instruction that can be used in one embodiment to cause access circuitry to perform a sequence of access operations in order to implement the move/rearrangement procedures illustrated schematically by FIG. 2.

FIG. 3 is a diagram illustrating various fields provided within the above mentioned single access instruction. A load/store identifier field 155 is used to identify whether the access instruction is a load instruction or a store instruction. A register identifier field 160 is then used to identify a plurality of registers that will be used as destination registers for a load instruction, or as source registers for a store instruction. There are a number of ways in which these various registers could be specified within the field 160. For example, assuming there is sufficient encoding space, each register may be individually identified within that field. However, often instruction encoding space is quite limited, and there may be insufficient space to uniquely identify each individual register.

Accordingly, in one embodiment, as shown in FIG. 3, a single register identifier 180 may be provided, along with an integer value N 175 identifying the number of registers. As mentioned earlier, the number of registers is intrinsically linked to the number of data elements in each data structure. Hence, considering the earlier example of FIG. 2, it may be the case that N is set equal to 3, and a single register is identified in the field 180. The decode circuitry 20 may then be arranged to apply a predetermined rule to determine which registers are to be used. For example, it may be decided to use a sequence of sequential registers starting from the register identified in the field 180. Accordingly, purely by way of example, if the field 180 identified vector register Z0, and N is set equal to 3, the decode circuitry may determine that vector registers Z0, Z1 and Z2 are to be used.

In one embodiment, the register identifier specified in the field 180 is arranged to be incremented modulo the number of architectural vector registers. Hence, for example, if the register specifier 180 identified vector register 30, of an available set of vector registers 0 to 31, and N was again equal to 3, the decode circuitry may determine that the vector registers to be used are vector registers 30, 31 and 0.

As will be discussed in more detail later, the instruction may optionally include a predicate identifier field 165 in order to identify active lanes within the specified registers, and hence identify the plurality of data structures to be moved. This will be discussed in more detail later with reference to FIGS. 6 and 7.

The instruction encoding 150 will also include a data structure identifier field 170 providing sufficient information to determine the addresses of the plurality of data structures that need to be accessed. The information in this field can take a variety forms, and four examples are shown in FIG. 3.

In accordance with example A of FIG. 3, a vector register identifier 190 is provided within the field 170, which identifies a vector register that contains a series of arbitrary pointers to each of the required data structures. The pointers may point to either the start or the end of those data structures. Hence, in one embodiment each data element in such a vector register will provide a pointer used to determine the address of an associated data structure, and accordingly it will be seen that the location of each of the data structures relative to the other data structures can be entirely arbitrary.

In accordance with example B of FIG. 3, a scalar register identifier 200 is used to identify one of the scalar registers 80 whose stored data value identifies a base address. A vector register identifier 205 is then used to identify a vector register whose stored data elements provide offsets relative to the base address for each of the required data structures. Hence, the address of each data structure can be found by adding the relevant offset value to the base address. Again, it can be seen that this effectively allows data structures from arbitrary locations to be accessed via the single instruction.

Example C again uses the scalar register identifier 200, but in addition provides an immediate value 215 encoded within the instruction, that specifies a constant stride value. Hence, in that arrangement, whilst each of the data structures are discontiguously located with respect to each other in memory, the various data structures are separated from each other by a regular distance within the memory address space. Hence, in one embodiment the address of a first data structure may be derived from the base address, whilst the next data structure will have an address calculated by adding the immediate value to the base address. The next data structure after that will then have an address which is calculated by adding two times the immediate value to the base address, and so on.

Example D illustrates another alternative where, instead of the immediate value 215, a scalar register identifier 225 is identified whose content specifies a constant stride value. Hence, the calculation of the address of each data structure in accordance with example D is the same as discussed above for example C.

In one embodiment the vector length (i.e. the number of data elements in each vector) and the size of the data elements may be implicit. However, in an alternative embodiment such information can be encoded within the instructions. For example, the instruction encoding could include information identifying the data element size (e.g. 8, 16, 32 or 64 bits), with the vector length then being determined from the size of the vector registers referred to in the instruction and the specified data element size. The specified data element size may also be used to perform scaling of other information specified in the instruction, such as the stride information.

Figure 4:
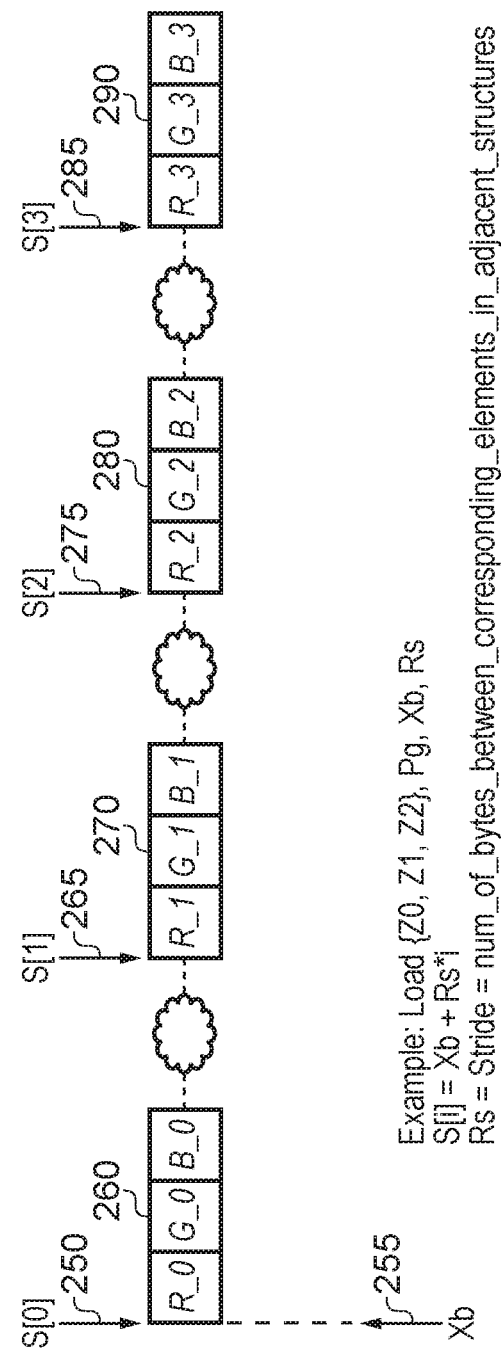
FIG. 4 illustrates how information provided in the instruction can be used to identify a series of addresses in memory associated with the required discontiguous data structures to be accessed.

FIG. 4 is a diagram illustrating the calculation of the various addresses of the relevant discontiguous data structures in accordance with one embodiment. In this example, it is assumed that the instruction encoding is as shown in example D of FIG. 3, and in particular a load instruction is specified that loads vectors of data elements in to the three vector registers Z0, Z1 and Z2. The instruction also includes an optional predicate field Pg, but in this example it is assumed that the predicate, if specified, identifies that all of the lanes are active. Further a scalar register identifies a base address, this scalar register being referred to as Xb in FIG. 4. In addition, another scalar register Rs is used to identify the constant stride value. In this particular example, it is assumed that the base register is specified in a 64-bit scalar register, which is referred to herein as an X register. The use of the term "R" in connection with the register identifying the stride is more generic, and could be mapped to either a 32-bit scalar register or a 64-bit scalar register, dependent on embodiment.

As can be seen, the address for a particular data structure "i" is found by multiplying the stride specified in the stride register by i, and then adding that to the base address found in the base register. In this embodiment, it is assumed that the stride value directly specifies the number of bytes between corresponding data elements in adjacent structures. It will however be appreciated that the stride data in the scalar register Rs could be specified in a number of ways, and for example could be specified in units of data structure size instead of in units of byte size if desired, or specified by a value scaled by the number of bytes per data element. It could alternatively be specified as a number of bits instead of a number bytes.

As a yet further alternative, the required stride information can also be determined by combining the value obtained from the scalar register with information about the data element size and the number of data elements within each data structure.

Figure 5:
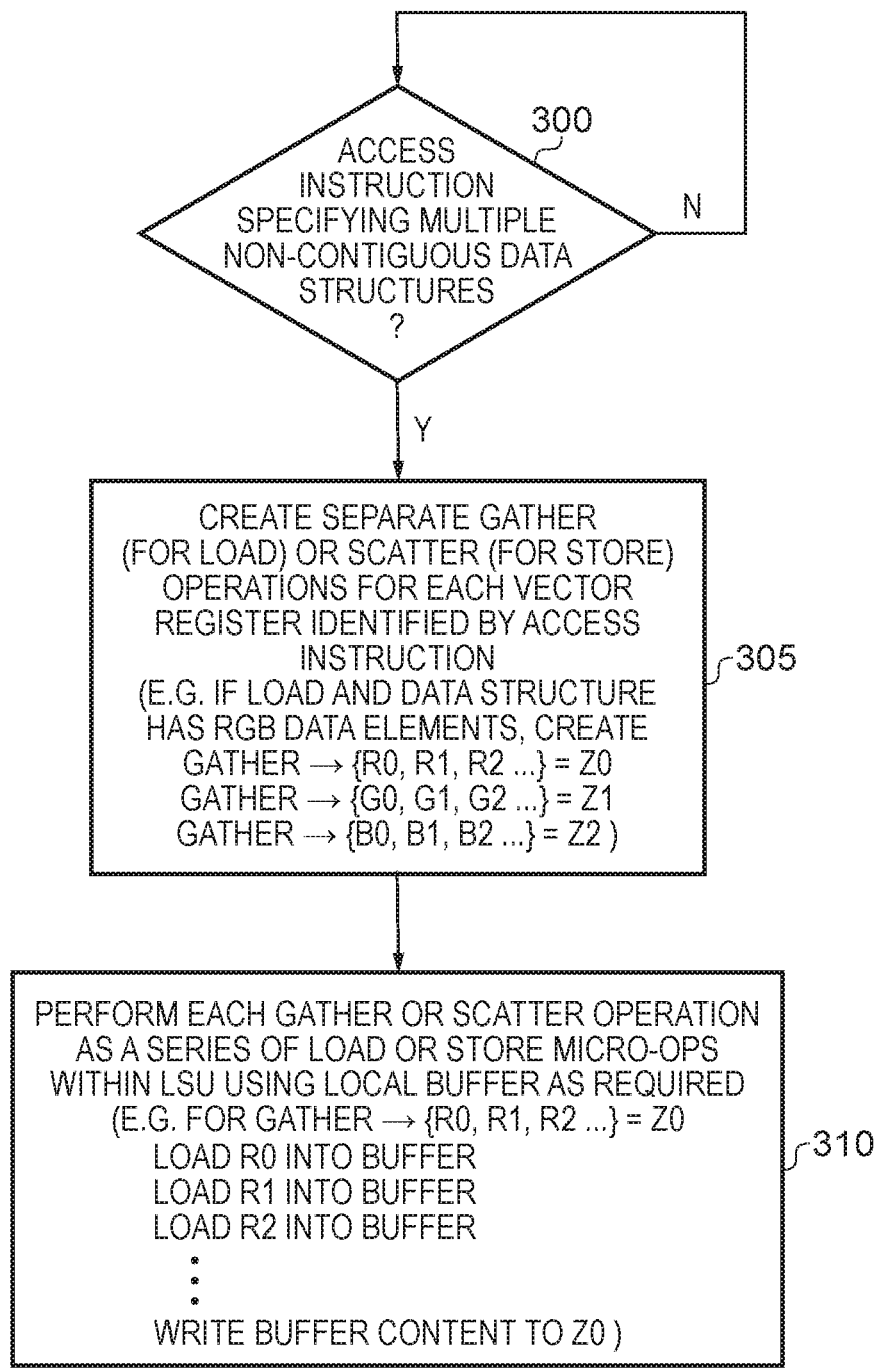
FIG. 5 is a flow diagram illustrating the steps performed on execution of a single access instruction specifying multiple non-contiguous data structures, in accordance with one embodiment.

FIG. 5 is a flow diagram illustrating the operations performed by the apparatus of FIG. 1 upon occurrence of an access instruction of the above mentioned type, that specifies multiple non-contiguous data structures. On detection by the decode circuitry 20 of such an instruction at step 300, the decode circuitry 20 is then arranged at step 305 to create separate gather or scatter operations for each vector register identified by the access instruction. In particular, for a load instruction, the decoder will create control signals for a series of gather operations, whilst for a store instruction the decoder will create control signals for a series of scatter operations. Hence, purely by way of example, if the instruction is a load instruction and the data structure has RGB data element components, the decode circuitry will create control signals to define three gather operations, a first gather operation to load the red pixel values from the identified data structures into one destination register, a separate gather operation to load the green pixel values from the identified data structures into another vector register, and a final gather operation to load the blue pixel values from the identified data structures into a third vector register.

In due course, the required control signals identifying those gather/scatter operations will be forwarded to the load/store unit 40 to cause those operations to be performed at step 310. In one embodiment, the load/store unit can be arranged to perform each gather or scatter operation as a series of load or store micro-operations using the local buffer 60 as required. Hence purely by way of example, if performing a gather operation to load the red pixel values from the identified data structures into the vector register Z0, a load micro-operation may be performed to obtain the red pixel data element R0 from memory and to store it in the buffer 60, whilst separate load micro-operations are then used to load in the remaining red pixel data elements from memory, which are also stored in the buffer 60. Once all of the required red pixel values have been obtained, a single write to the vector registers 70 can then take place in order to store that vector operand of red pixel values into the vector register Z0.

Alternatively, if the load/store unit 40 did not have access to local buffer storage, it could instead perform multiple accesses to the vector register Z0 during performance of the load micro-operations, so as to store each individual data element into the vector register as it is retrieved from memory.

Figure 6:
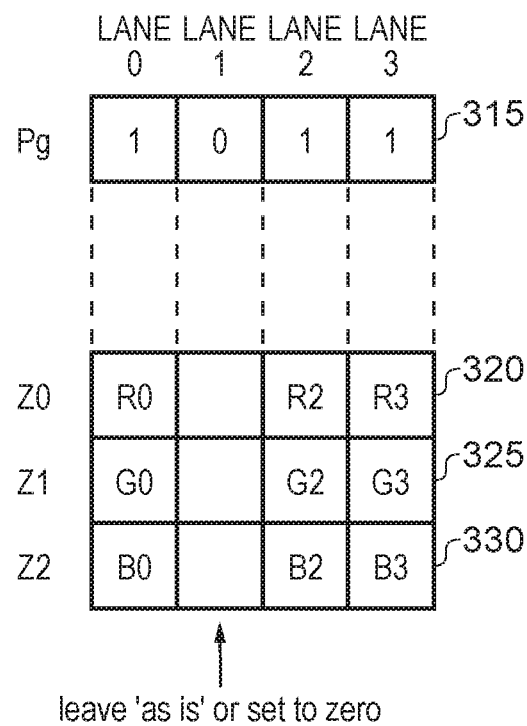
FIG. 6 schematically illustrates how predicate information identified by the single access instruction may be used in one embodiment.

FIG. 6 schematically illustrates how the predicate information may be used in accordance with one embodiment, where such predicate information is specified within the predicate identifier field 165 of the instruction encoding 150. In particular, in one embodiment the predicate identifier field 165 may be used to identify a general purpose predicate register Pg which stores as predicate information a single predicate bit for each lane within the vector registers 320, 325, 330 shown in FIG. 6. In particular, it can be seen that each lane incorporates a corresponding data element position from each of the plurality of vector registers specified by the access instruction.

If the predicate bit is set to a first value, this is used to indicate that the corresponding lane is active, whereas if it is set to a second value this is used to indicate that the corresponding lane is inactive. In the example shown in FIG. 6, it is assumed that a logic one value indicates an active lane and a logic zero value indicates an inactive lane, but it will be appreciated that the meaning of those bits could be reversed if desired.

Considering by way of example a load operation, and assuming the four data structures shown in FIG. 4 are identified by the data structure identifier field 170 of the instruction, the presence of a logic zero value in lane 1 will cause the load/store unit to determine that the data structure 270 does not need to be retrieved from memory. Accordingly, even if the instruction has specified a constant stride, for instance by using examples C or D of FIG. 3, and hence the pointer S[1] would naturally be identified when computing the series of addresses, the presence of inactive lane 1 causes that access to be suppressed. Instead, only data structures 260, 280 and 290 are accessed, with their various data elements being stored within lanes 0, 2 and 3 of the vector registers 320, 325, 330. In one embodiment, within the vector registers 320, 325, 330, the data value at the data element position associated with lane 1 is set to a logic zero value when the vector is written into each of those registers. However, in an alternative embodiment, the new data contents can be merged with the existing contents, so that after the registers have been updated, the contents of lane 1 are dictated by the existing data element values within that lane.

The predicate information can be used in a similar manner when performing a store operation. In particular, when the load/store unit reads the contents of the various registers 320, 325, 330, it will decide that there is no need to store the R1, G1 and B1 data elements out to their associated data structure 270, and hence will suppress performing the relevant store operation to memory in respect of that data structure.

Figure 7:
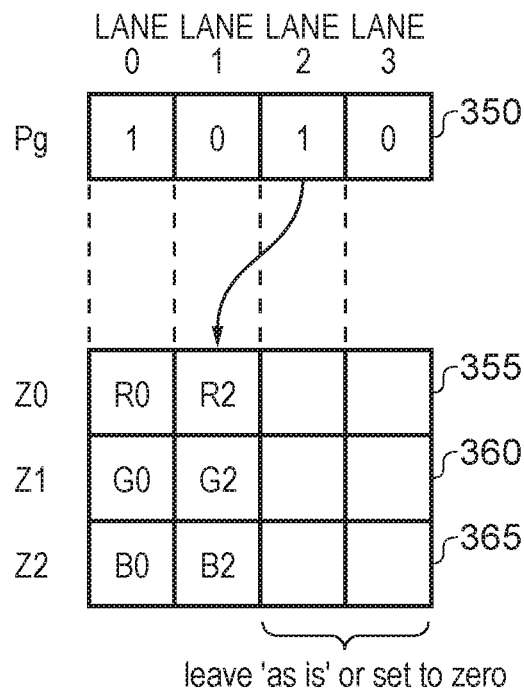
FIG. 7 illustrates how the predicate information specified by the single access instruction may be used to perform compaction when loading data structures from memory into multiple vector registers, in accordance with one embodiment.

When performing load operations, the predicate information can also optionally be used to perform compaction if desired, as illustrated schematically in FIG. 7. In this example, the predicate information 350 identifies that lanes 0 and 2 are active, but lanes 1 and 3 are inactive. Hence, with reference to the example of FIG. 4, this would identify that the data structures 260, 280 need to be accessed, but the data structures 270, 290 do not. Accordingly, only data structures 260 and 280 are accessed. However, rather than writing the contents of the data structure 280 into lane 2, they are instead written into lane 1. Hence, by virtue of the compaction, the data elements obtained for each of the active lanes are written into the vector registers 355, 360, 365 so as to occupy consecutive lanes within those registers. The remaining lanes' contents are either zeroed, or left "as is", i.e. they maintain the previous values stored at those data element positions within the various registers 355, 360, 365. If desired, a further load instruction can then be used to fill the remaining lanes with required data from discontiguous data structures.

This can provide a further optimisation, by potentially avoiding the need to perform any subsequent rearrangement operations on the contents of the registers after they have been loaded with the contents of discontiguous data structures from memory.

Figure 8:
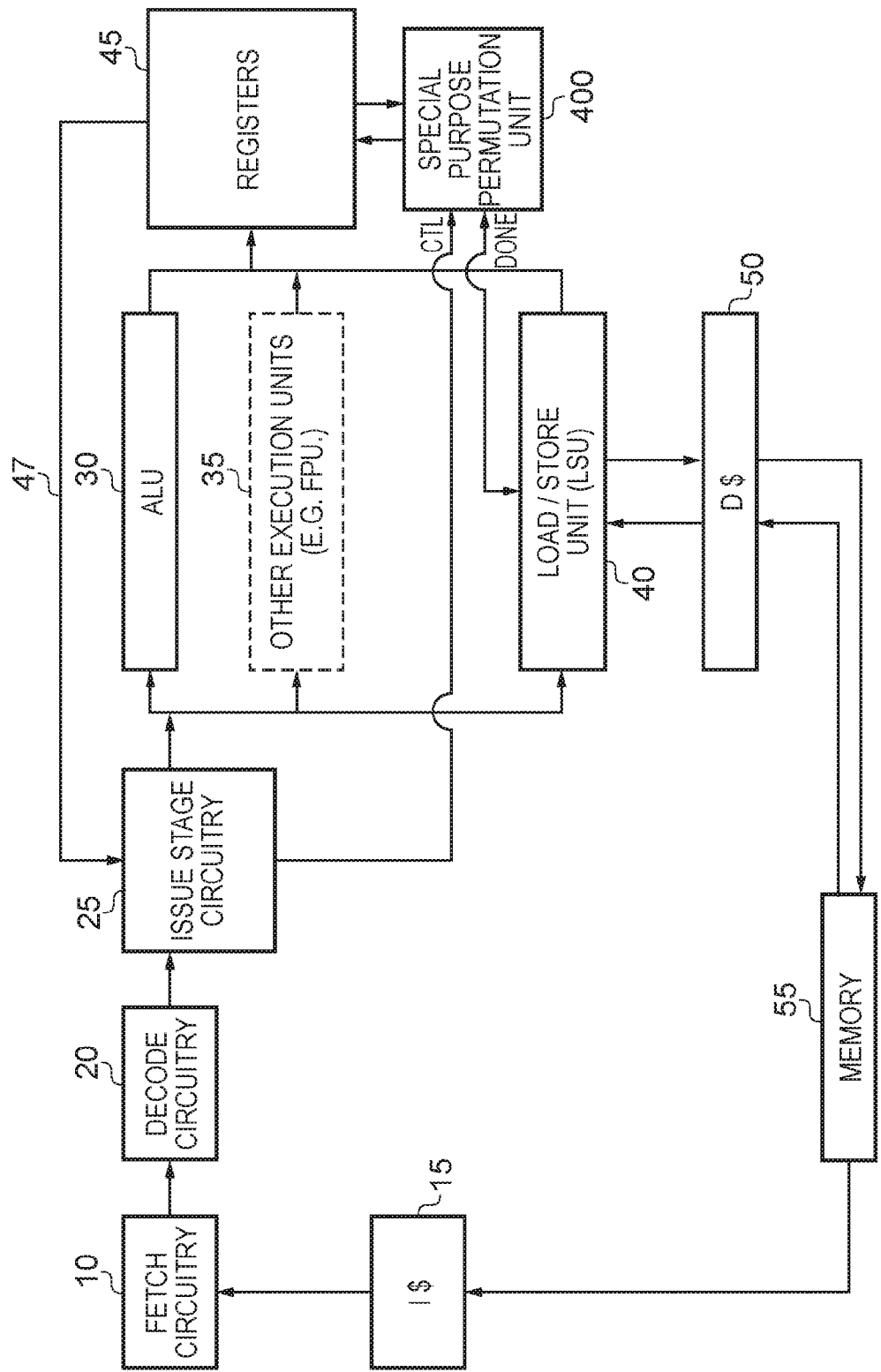
FIGS. 8 and 9 are block diagrams illustrating a data processing apparatus in accordance with two alternative embodiments.

FIG. 8 illustrates an alternative form of the data processing apparatus of FIG. 1, where the load/store unit 40 operates in combination with a special purpose permutation unit 400 in order to perform the required rearrangement operations. Hence, in this embodiment the various control signals produced by the decode circuitry 20 when decoding the earlier described access instructions will provide both control information for the load/store unit and control information for the special purpose permutation unit 400. Considering by way of example a load instruction, the issue stage circuitry would issue a series of control signals to the LSU 40 to cause it to fill a number of vector registers within the registers 45 with data elements obtained from memory. In this instance, within each vector register, the contents stored by the LSU in that vector register will be data elements obtained from contiguous addresses in memory. Hence, at this point, the individual data elements of each data structure have not been separated out into different vector registers. However, once the LSU 40 has performed the required load operations, it notifies the special purpose permutation unit 400 via a "Done" signal, at which point the special purpose permutation unit uses control information provided by the issue stage circuitry to retrieve the values from the relevant registers, reorder them as required, and then write them to the destination registers specified by the original access instruction.

For a store instruction, similar steps can be taken, but in this instance the special purpose permutation unit 400 will typically perform the required permutations first, whereafter it will issue a Done signal to the load/store unit, so that the load/store unit can then write the data elements out to memory in their required order within the individual data structures.

Hence, considering by way of example the sequence of data structures shown in FIG. 4, and again assuming that the destination registers are Z0, Z1 and Z2, and that a load instruction is being executed, the load/store unit could be arranged to perform four load operations in order to load the data structure 260, and potentially some additional data values from contiguous addresses following that data structure, into a first vector register, and likewise to store the second data structure 270 into a different vector register, the third data structure 280 into another different vector register, and the fourth data structure 290 into a yet further vector register (again in each of these vector registers there may also be some additional data values from contiguous addresses following the relevant data structure). These vector registers are effectively used as intermediate vector registers, and need not be any of the registers Z0, Z1 and Z2 specified by the original load instruction. The special purpose permutation unit 400 will then access the contents of those various intermediate vector registers, perform the required permutations, and then store the vector operands that are required back to the destination vector registers Z0, Z1 and Z2. Hence, the special purpose permutation unit 400 will organise all of the red pixel values into a single vector, all of the green pixel values into another vector, and all of the blue pixel values into a further vector, when performing the example load of FIG. 4.

Figure 9:
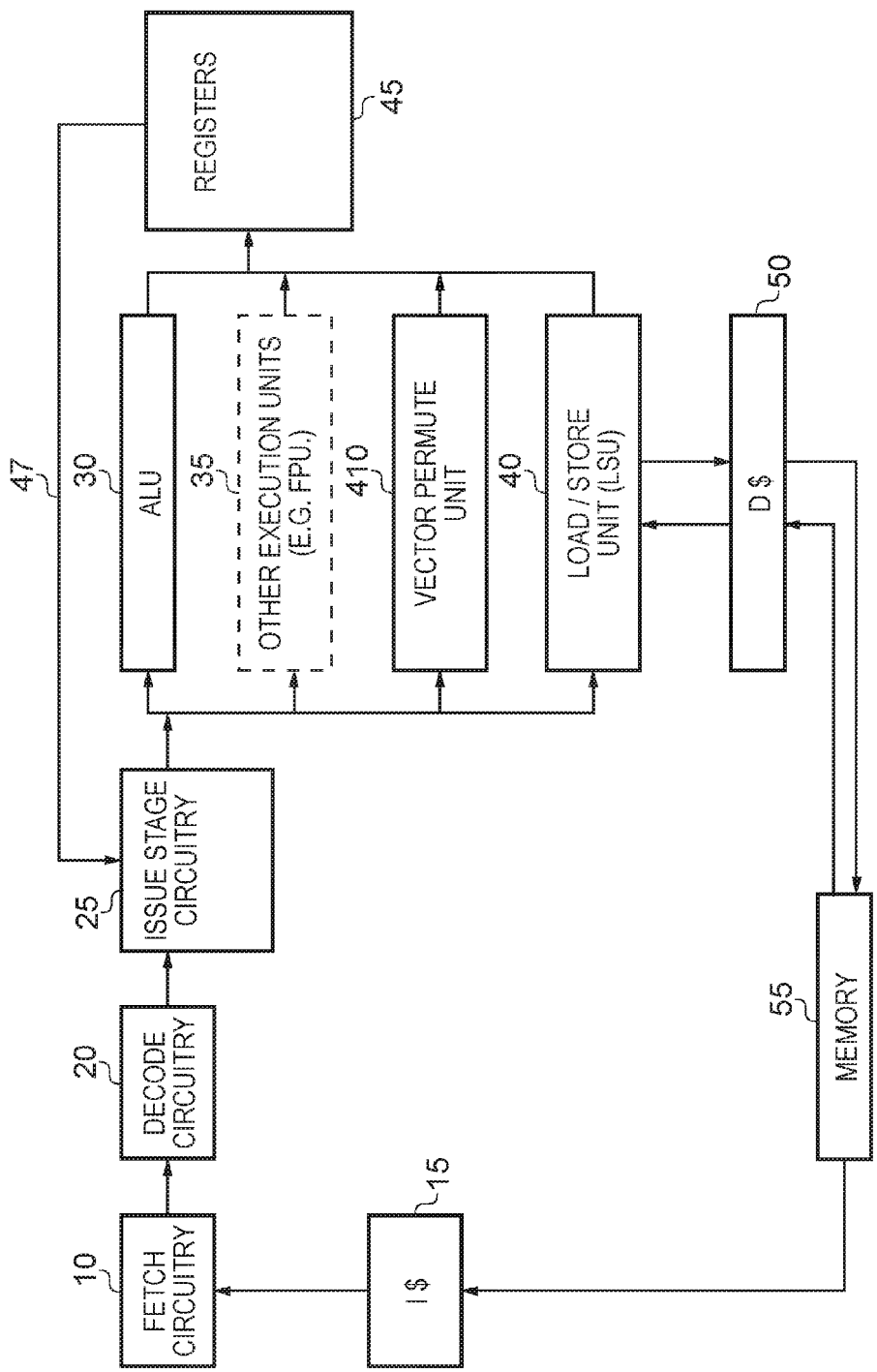

FIG. 9 illustrates a yet further example arrangement where a special purpose permutation unit 400 is not used, and instead use is made of an existing vector permute unit 410 forming one of the execution units within the data processing pipeline. Effectively, the vector permute unit 410 will perform similar functions to those of the special purpose permutation unit 400, but will obtain the source operands for its permute operations via the issue stage circuitry 25 and the path 47 from the registers 45. The issue stage circuitry 25 will hence issue appropriate control signals to the vector permute unit 410 to identify the required permutations that need to be performed on the source operand values provided, and will also identify the destination registers into which the permuted data then needs to be stored.

Figure 10:
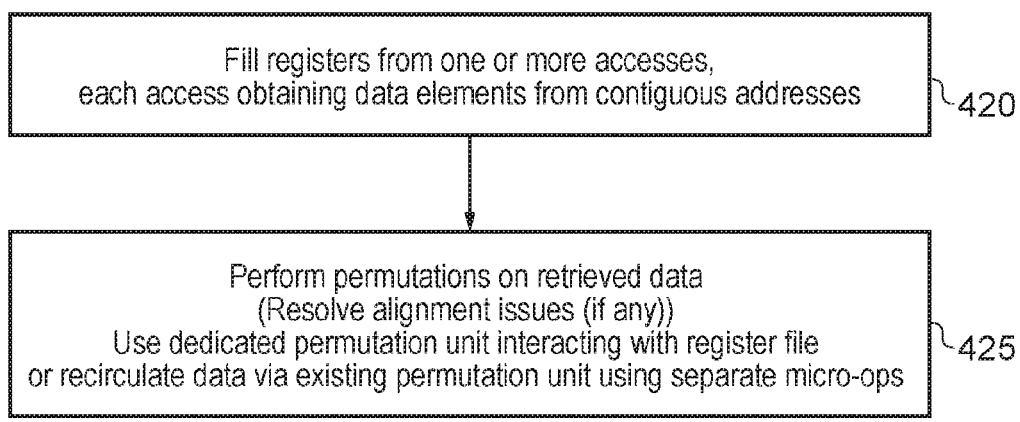
FIG. 10 is a flow diagram illustrating how the apparatus of FIG. 8 or FIG. 9 may be used in one embodiment to perform a sequence of access operations in order to implement the move/rearrangement procedures illustrated by way of example with reference to FIG. 2.

FIG. 10 is a flow diagram illustrating the sequence of operations when adopting the approach of either FIG. 8 or FIG. 9. In the flow diagram of FIG. 10, it is assumed that a load operation is being performed. Accordingly, the load/ store unit will fill the intermediate registers with data elements from one or more accesses. The individual accesses may be to discontiguous memory addresses, but all of the data elements obtained during each access will be from contiguous addresses. Hence, at this point the contents of the intermediate vector registers will not be separated out into component data elements of the data structures as required.

However, at step 425, the permute unit will then perform the required permutations on the data that the LSU has retrieved. It will also need to resolve any alignments issues that may be present. In the earlier example where each of the four data structures identified in FIG. 4 were stored in a separate vector register by the LSU, and the first data element retrieved was the red pixel value in each case, there are no alignment issues, but it will be appreciated that in other embodiments it may not be the case that the data contained within the series of intermediate registers is pre-aligned in that way and some alignment may be necessary in order to correctly identify the corresponding data elements of each data structure. As shown in FIG. 10, this step can either be performed using the dedicated permutation unit 400 of FIG. 8 interacting with the register file 45, or instead can be performed by recirculating data over path 47 through the existing permutation unit 410 of FIG. 9 and using separate micro-operations issued by the issue stage circuitry 25.

When executing a store instruction rather than a load instruction, steps 420 and 425 are effectively reversed.

It will be appreciated that the order in which the various steps are performed in the above described embodiments may be altered in different embodiments. For example, when considering the encodings of FIG. 3, it will be appreciated that the access circuitry could operate on the data structures in reverse order.

In another example configuration, it may be arranged that when adopting any of the example encodings B, C or D in FIG. 3, the access instruction could also be arranged to update the base register automatically upon completion of the required load/store operations (referred to herein as post-index updating). This would hence enable another instance of the load/store instruction to be specified using the same base register specifier, but operating on a further sequence of data structures, without needing a separate instruction to update the base register.

As a yet further alternative, memory speculation could be employed in some variants, where during execution of load instructions, one or more of the data elements in each vector is loaded speculatively. In particular, when vectorising the code to take advantage of the available vector operations, some of the data structures loaded into the vector registers may or may not in due course actually be required for processing. In such situations, the apparatus can note that one or more of the accesses to be performed during the load operation are speculative accesses. If a fault occurs during a normal access, then it will typically be necessary to process that fault, for example by taking an exception. However, in one embodiment, if a fault is detected during a speculative retrieval of one or more of the data structures from memory, such action is not taken. Instead, in such arrangements, a memory fault will only be generated if it occurs in the first active lane (which will be non-speculative).

Figure 11:
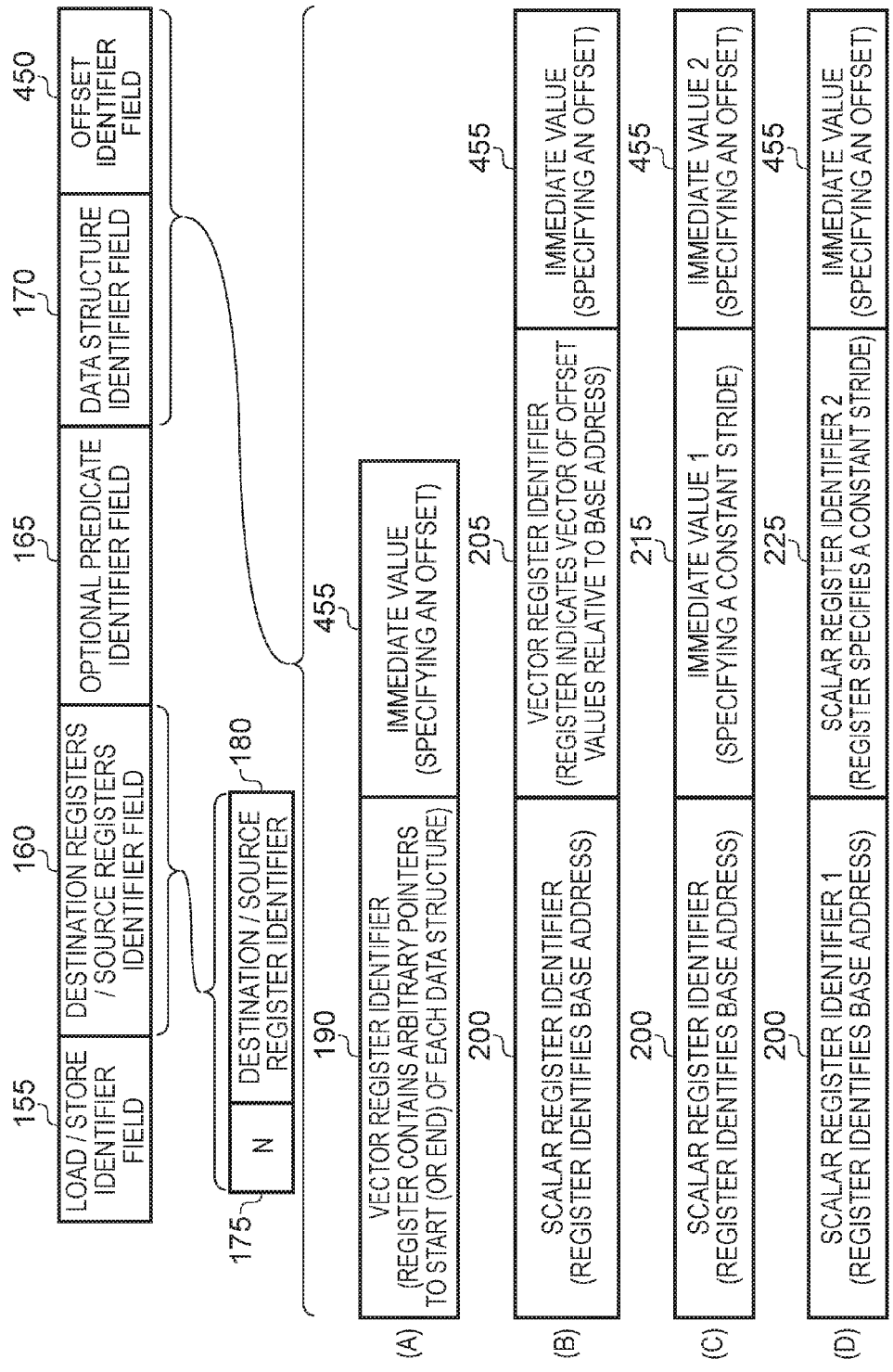
FIG. 11 illustrates how an additional offset identifier field may be added to the instruction encoding in accordance with one embodiment.
Figure 12:
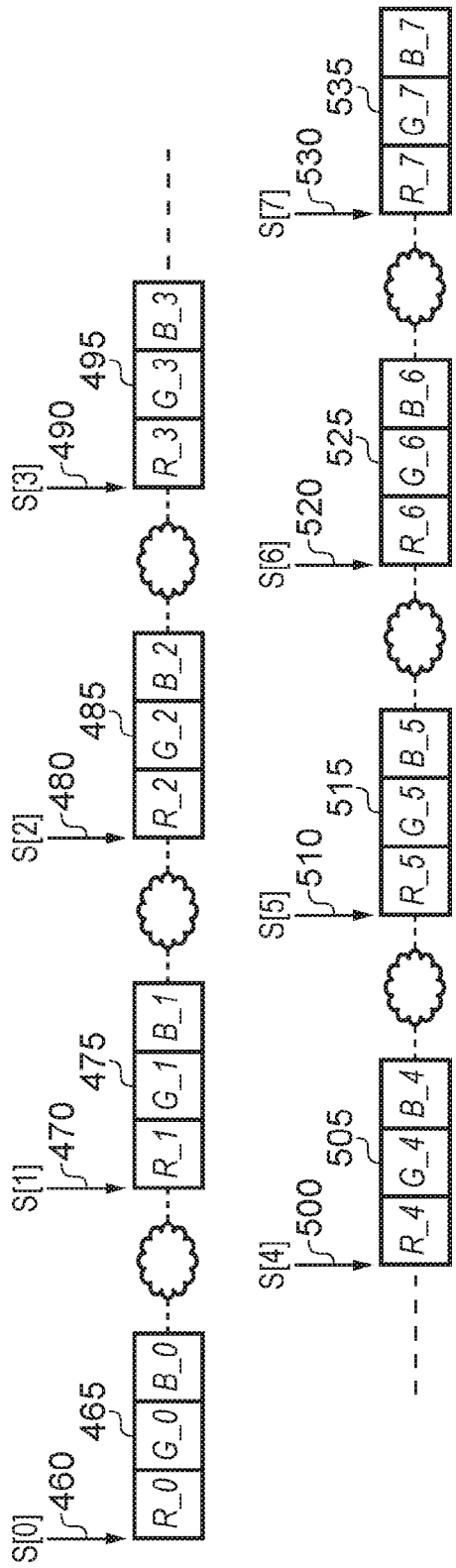
FIG. 12 illustrates how the additional offset identifier field of FIG. 11 may be used for two consecutive load instructions in accordance with one embodiment.

FIG. 11 illustrates an alternative form of encoding for the access instruction, where an additional offset identifier field 450 is provided. Each of the four encoding options A, B, C and D is hence supplemented by an immediate value 455 specifying an offset. As an alternative to an immediate value, a separate scalar register could be identified whose value specifies the required offset. The manner in which the offset is used is then illustrated schematically in FIG. 12. In particular, it would allow multiple instances of an instruction to be specified that use the same data structure identifier information (in the example of FIG. 12 this being in the form of a base register and a stride register), but where in each instance the offset value is changed. Hence, this enables a loop of instructions to be unrolled in a more efficient manner to make better use of the vector processing resources. In particular, in the unrolled loop, a first load instruction will specify an offset of zero, and accordingly will load and de-interleave into vector registers Z0, Z1 and Z2 the four data structures 465, 475, 485, 495 using the addresses 460, 470, 480, 490 generated using the calculation shown in FIG. 12. The next load instruction can then use exactly the same base and stride information, but specify an offset of 1, and load the retrieved data elements into a further three vector registers, in this case registers Z3, Z4 and Z5. As a result, this instruction will load and de-interleave the four data structures 505, 515, 525, 535 identified by the addresses 500, 510, 520, 530 that are again identified using the calculation shown in FIG. 12. The value "VL" is the vector length, i.e. the number of data elements in a vector register.

By such an approach, it is possible to reduce the number of instructions performing address computations in unrolled loops, and would also avoid the need for the earlier mentioned post-index updating form that would adjust the base pointer as a side effect of the instruction.

From the above described embodiments, it will be appreciated that the new form of access instruction described herein enables significant efficiency gains when performing complex access operations. A significant advantage is obtained in terms of execution speed. The number of instructions executed can be significantly reduced, which in addition to increasing execution speed can also reduce power consumption within the apparatus. When using the above described instructions, this raises the level of abstraction and makes complex accesses less error prone, hence easing the process of writing programs where such complex access operations are required.

There are many applications which make use of data structures comprising multiple data elements. As an example, applications which make use of data structures similar to the following examples might benefit from the use of the above described instruction:

| | |
|---|---|
| Complex numbers | {Re, Im} |
| Pixel data | {RED, GREEN, BLUE, ALPHA} |
| Graph traversal node object | {Connection_ID, weight} |
| Geometric data | {width, height, angle} |
| Payroll bundle | {id, salary, tax} |
| Electromagnetic field values | {B_vector, H_vector, D_vector, E_vector} |
| Spatial coordinates | {X, Y, Z} |
| Motion data | {position, velocity, acceleration, mass} |

Figure 13:
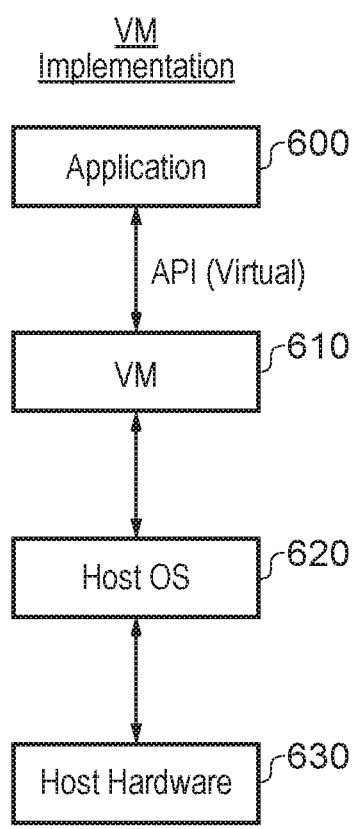
FIG. 13 illustrates a virtual machine implementation that may be employed in one embodiment.

FIG. 13 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 630 running a host operating system 620 supporting a virtual machine program 610. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 610 provides an application program interface to an application program 600 which is the same as the application program interface which would be provided by the real hardware which is the device being modelled by the virtual machine program 610. Thus, the program instructions, including the access instructions described above that specify multiple non-contiguous data structures, may be executed from within the application program 600 using the virtual machine program 610 to model their interaction with the virtual machine hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
a set of vector registers, each vector register arranged to store a vector operand comprising a plurality of data elements;
access circuitry to perform access operations to move data elements of vector operands between data structures in memory and said set of vector registers, each data structure comprising multiple data elements stored at contiguous addresses in said memory;
decode circuitry, responsive to a single access instruction identifying a plurality of vector registers from said set and a plurality of data structures that are located discontiguously with respect to each other in said memory, to generate control signals to control the access circuitry to perform a sequence of said access operations to move said plurality of data structures between said memory and said plurality of vector registers such that the vector operand in each vector register of said plurality holds a corresponding data element from each of said plurality of data structures.

2. An apparatus as claimed in claim 1, wherein the multiple data elements of one or more of the plurality of data structures are rearranged as they are moved between said memory and said plurality of vector registers.

3. An apparatus as claimed in claim 1, wherein said single access instruction is a load instruction, and the access circuitry is responsive to the control signals to perform said sequence of access operations in order to obtain the data elements of each identified data structure from said memory and to write into each identified vector register a vector operand comprising a corresponding data element from each of said plurality of data structures.

4. An apparatus as claimed in claim 3, wherein said sequence of access operations comprises a sequence of gather operations, each gather operation obtaining a corresponding data element from each of said plurality of data structures and writing the obtained data elements into a vector register associated with that gather operation.

5. An apparatus as claimed in claim 1, wherein said single access instruction is a store instruction, and the access circuitry is responsive to the control signals to perform said sequence of access operations in order to read from each identified vector register a vector operand comprising a corresponding data element from each of said plurality of data structures, and to rearrange the data elements as they are written to said memory so as to store each data structure at an address in said memory corresponding to its discontiguous location whilst ensuring that the data elements of each individual data structure are stored at contiguous addresses in said memory.

6. An apparatus as claimed in claim 5, wherein said sequence of access operations comprises a sequence of scatter operations, each scatter operation obtaining from a vector register associated with that scatter operation a vector operand comprising a corresponding data element from each of said plurality of data structures, and writing the data elements of that vector operand to addresses in said memory determined from the addresses of said plurality of data structures.

7. An apparatus as claimed in claim 1, wherein said single access instruction includes a data structure identifier field providing information used to determine the addresses of said plurality of data structures.

8. An apparatus as claimed in claim 7, further comprising:
a set of scalar registers to store scalar data values;
wherein said data structure identifier field comprises a scalar register identifier field identifying a scalar register from said set whose stored scalar data value is used to determine a base address in said memory, and a stride identifier field containing stride information used to derive the addresses of said plurality of data structures from said base address.

9. An apparatus as claimed in claim 8, wherein said stride information identifies a constant stride value.

10. An apparatus as claimed in claim 9, wherein said stride identifier field includes one of an immediate value and a scalar register identifier in order to identify said constant stride value.

11. An apparatus as claimed in claim 8, wherein said stride information identifies a series of stride values, each stride value being associated with at least one of said plurality of data structures.

12. An apparatus as claimed in claim 11, wherein said stride identifier field identifies a vector register within said set, and each data element in said vector register identifies a stride value to be used to determine from the base address the address of an associated one of said data structures.

13. An apparatus as claimed in claim 7, wherein said data structure identifier field identifies a vector register within said set, and each data element in said vector register provides pointer data used to determine the address of an associated one of said data structures.

14. An apparatus as claimed in claim 1, wherein said single access instruction includes a vector register identifier field providing information used to determine said plurality of vector registers to be accessed.

15. An apparatus as claimed in claim 14, wherein said vector register identifier field comprise a vector register identifier used to identify one vector register in said set and an integer value used to identify the number of vector registers in said plurality of vector registers to be accessed, the decode circuitry being arranged to apply a predetermined rule in order to determine each vector register in said plurality from the identified one vector register and said integer.

16. An apparatus as claimed in claim 15, wherein the decode circuitry is arranged to determine, as said plurality of vector registers to be accessed, a consecutive plurality of vector registers including the identified one vector register.

17. An apparatus as claimed in claim 1, wherein:
the access circuitry operates on a plurality of lanes, each lane incorporating a corresponding data element position from each of said plurality of vector registers;
said single access instruction includes a predicate identifier field providing predicate information used to determine which of said plurality of lanes are active lanes for the sequence of access operations; and
the access circuitry being arranged to determine, as said plurality of data structures to be moved, those data structures associated with the active lanes.

18. An apparatus as claimed in claim 17, wherein the single access instruction is a load instruction, and the access circuitry is arranged to perform a compaction operation using said predicate information, the predicate information being used to identify the plurality of data structures to be loaded, and the access circuitry being arranged to store those data structures within a series of consecutive lanes within the plurality of vector registers.

19. An apparatus as claimed in claim 7, wherein the single access instruction includes an offset identifier field providing offset data to be applied in combination with the information in the data structure identifier field when determining the addresses of said plurality of data structures.

20. An apparatus as claimed in claim 1, wherein the access circuitry comprises a load/store unit and an associated buffer storage to allow data elements to be temporarily buffered during performance of said sequence of access operations.

21. An apparatus as claimed in claim 1, wherein the access circuitry comprises a load/store unit and a vector permute unit which operate in combination to perform said sequence of access operations.

22. An apparatus as claimed in claim 21, wherein the load/store unit and vector permute unit are arranged to exchange data elements via one or more vector registers in said set that are used to store intermediate vectors of data elements.

23. A method of operating an apparatus to perform access operations to move data elements of vector operands between data structures in memory and a set of vector registers of the apparatus, each vector register arranged to store a vector operand comprising a plurality of data elements, and each data structure comprising multiple data elements stored at contiguous addresses in said memory, the method comprising:
decoding a single access instruction identifying a plurality of vector registers from said set and a plurality of data structures that are located discontiguously with respect to each other in said memory, to generate control signals to control access circuitry to perform a sequence of said access operations to move said plurality of data structures between said memory and said plurality of vector registers; and
moving, during performance of said sequence of access operations, the multiple data elements of each data structure such that the vector operand in each vector register of said plurality holds a corresponding data element from each of said plurality of data structures.

24. An apparatus comprising:
a set of vector register means, each vector register means for storing a vector operand comprising a plurality of data elements;
access means for performing access operations to move data elements of vector operands between data structures in memory and said set of vector register means, each data structure comprising multiple data elements stored at contiguous addresses in said memory;
decode means for generating, in response to a single access instruction identifying a plurality of vector register means from said set and a plurality of data structures that are located discontiguously with respect to each other in said memory, control signals to control the access means to perform a sequence of said access operations to move said plurality of data structures between said memory and said plurality of vector register means such that the vector operand in each vector register means of said plurality holds a corresponding data element from each of said plurality of data structures.

25. A computer program stored on a non-transitory computer readable storage medium that, when executed by a data processing apparatus, provides a virtual machine which provides an instruction execution environment corresponding to the apparatus of claim 1.

* * * * *